UNITED STATES PATENT OFFICE.

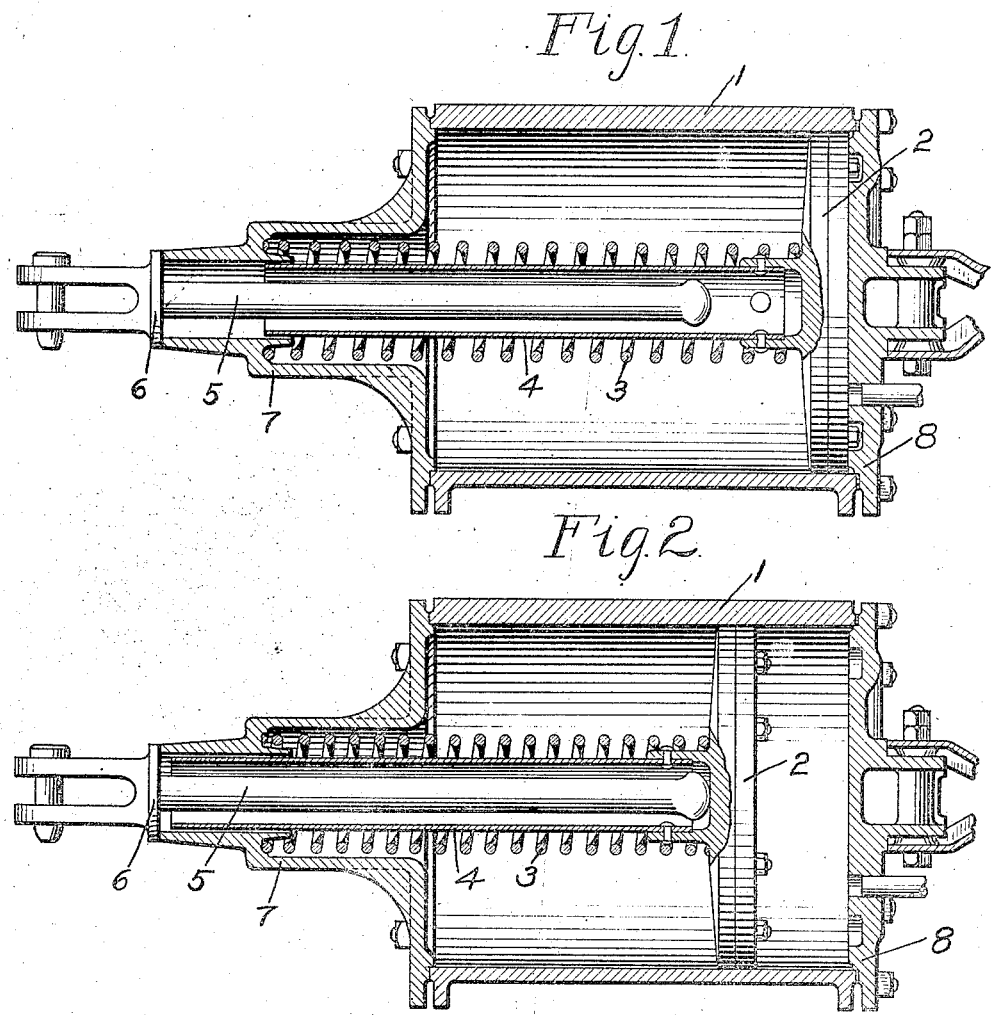

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

1,312,649.

Specification of Letters Patent.

Patented Aug. 12, 1919.

Application filed November 4, 1916. Serial No. 129,439.

*To all whom it may concern:*

Be it known that I, WALTER V. TURNER, a citizen of the United States, residing at Wilkinsburg, in the county of Allegheny and State of Pennsylvania, have invented new and useful Improvements in Fluid-Pressure Brakes, of which the following is a specification.

This invention relates to fluid pressure brakes, and more particularly to the construction of the brake cylinder portion of the brake apparatus.

The usual standard fluid pressure brake apparatus is calculated and designed so as to produce a predetermined pressure in the brake cylinder for a given reduction in brake pipe pressure, the brake cylinder piston travel being assumed as a predetermined amount, for example, eight inches.

There is usually more or less false piston travel due to the spring of the brake rigging and the like, and if the brake rigging be not rigid enough, this spring action is liable to be excessive and may cause the brake cylinder piston to strike the non-pressure head of the brake cylinder where the brakes are applied with force. In order to prevent this, it has been proposed to limit the piston travel as adjusted by the slack adjuster to less than the calculated piston travel, for example, five inches, in order to insure that the piston will not strike the cylinder head by reason of the false piston travel even when the brakes are heavily applied.

If, however, this is done, then, since the effective volume of the brake cylinder has been reduced by reason of the shorter piston travel, the brake cylinder pressure obtained for a given reduction in brake pipe pressure will exceed the calculated amount and will be excessive in many cases.

In order to remedy the last mentioned difficulty, the principal object of my invention is to provide means for preventing an excessive brake cylinder pressure, due to short piston travel, for a given reduction in brake pipe pressure. I preferably accomplish this object by lengthening the brake cylinder and by providing for a lost motion of the brake cylinder piston, relative to the brake rigging.

In the accompanying drawing; Figure 1 is a central sectional view of a brake cylinder embodying my improvement; and Fig. 2 a similar view, showing the brake cylinder piston with the lost motion taken up.

According to my invention, the brake cylinder 1 is made with a longer stroke than the standard brake cylinder and contains the usual brake cylinder piston 2, subject to the pressure of the release spring 3 and having a hollow stem 4 within which the piston rod 5 is contained.

The piston rod 5 is connected to the usual brake rigging and is provided with a collar 6 adapted to engage the outer end of the non-pressure head 7 of the brake cylinder 1.

When the brake cylinder piston 2 is against the pressure head 8 of the brake cylinder, there is a space between the end of the piston rod 5 and the brake cylinder piston, since the piston rod 5 is of the usual length, while the brake cylinder is of greater length, the collar 6 preventing further inward movement of the piston rod.

If fluid under pressure is supplied to the brake cylinder to effect an application of the brakes, the brake cylinder piston 2 first moves out to the position shown in Fig. 2 of the drawing, in which the piston engages the end of the piston rod 5 and the piston rod is then actuated by the further movement of the brake cylinder piston to apply the brakes. If it be assumed that the slack adjuster is set for a piston travel of five inches and that the lost motion of the brake cylinder piston is three inches, then the brake cylinder piston will move out eight inches for an effective brake cylinder piston travel of five inches.

It will thus be seen that the brake cylinder pressure for a given reduction in brake pipe pressure can be made to correspond with that obtained in the usual standard equipment for a given brake cylinder piston travel, although the effective piston travel is less, thus obviating the danger of striking the cylinder head.

In releasing the brakes after a brake application, the piston rod 5 moves back until the collar 6 engages the end of the non-pressure head 7 while the brake cylinder piston 2 continues its movement to the pressure head 7 of the brake cylinder, so that the slack will be adjusted by the slack adjuster with reference to the effective brake cylinder piston travel instead of the actual piston travel.

Having now described my invention, what I claim as new and desire to secure by Letters Patent is:

1. In a fluid pressure brake, the combination with an extended brake cylinder and a brake cylinder piston rod of the usual length, of a brake cylinder piston having a preliminary movement relative to the piston rod in applying the brakes.

2. In a fluid pressure brake, the combination with a brake cylinder, of a brake cylinder piston and a brake cylinder piston rod provided with a stop adapted to engage the brake cylinder for limiting the movement of the rod with respect to the brake cylinder piston.

3. In a fluid pressure brake, the combination with a brake cylinder, of a brake cylinder piston and a brake cylinder piston rod provided with means for limiting the release movement of the rod to thereby permit an initial movement of the brake cylinder piston relative to the piston rod in applying the brakes.

In testimony whereof I hereunto set my hand.

WALTER V. TURNER.